J. P. Driver,
Casting Bullets.

Nº 37,389.   Patented Jan. 13, 1863.

Witnesses.   Inventor.

UNITED STATES PATENT OFFICE.

J. P. DRIVER, OF MARENGO, IOWA.

IMPROVEMENT IN MACHINES FOR CASTING BULLETS.

Specification forming part of Letters Patent No. 37,389, dated January 13, 1863.

*To all whom it may concern:*

Be it known that I, J. P. DRIVER, of Marengo, in the county of Iowa and State of Iowa, have invented a new and Improved Bullet-Casting Machine; and I do hereby declare that the following is a full, clear, and exact description of the same, reference being had to the accompanying drawings, forming part of this specification, in which—

Figure 1:
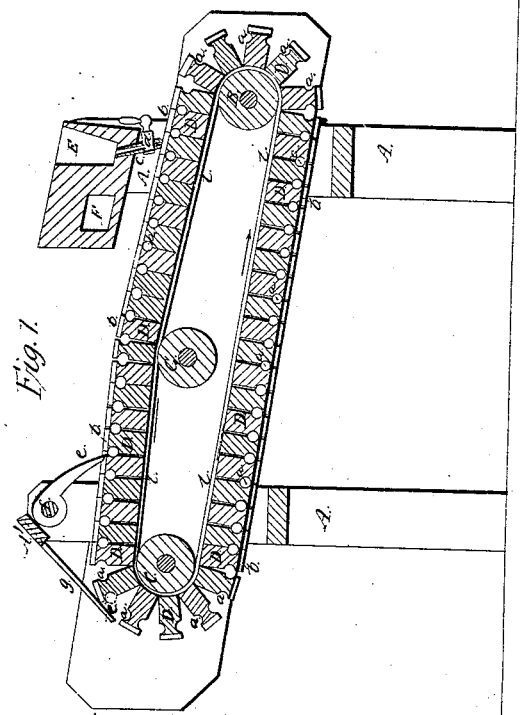
Figure 2:
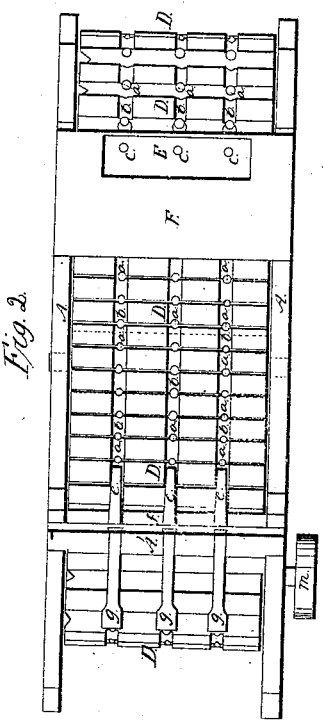

Figure 1 is a longitudinal vertical section of the machine, and Fig. 2 a plan of the same.

Similar letters of reference indicate corresponding parts in both figures.

This invention consists in an endless series of molds carried by one or more endless belts or chains, or connected together to form an endless chain, by whose movement around two pulleys or drums the molds are closed for the reception of the molten lead and opened for the discharge of the bullets.

It also consists in certain devices employed, in combination with the endless series of molds, for the purpose of cutting off the sprues from the bullets and releasing and discharging them from the molds.

To enable others to make and use my invention, I will proceed to describe its construction and operation.

A is the framing of the machine. B C are the two drums which carry the endless belt $l$, to which the molds D D are attached, and by which they are connected together. The molds D D are composed of a series of parallel-sided blocks, of cast-iron or other suitable material, which fit close together on the straight portions of the belt. Each of these blocks has on each side two or more cavities, $a$, constituting halves of molds, and matching with corresponding cavities in the adjacent blocks on either side, every two matching cavities combining to constitute a mold.

In the machine represented there are three cavities in each side of each block, making three sets of molds; but there may be any number of sets.

In the outer faces of the mold-blocks D D there are grooves $b$ $b$ opposite to the mold-cavities $a$ $a$, the bottoms of the said grooves being close to the molds and the direction of the said grooves being lengthwise of the endless belt.

In order to prevent the heating and consequent injury of the endless belt, which may be of leather, heavy woven fabric, or other material, wood or other non-conducting material may be interposed between the mold-blocks D D and the belt. The drum C is higher than B, which gives the belt a downward inclination toward B, near to which and over the molds is arranged a melting-pot, E, in which the lead is kept melted by a furnace, F, and from which it runs by a series of nozzles, $c$ $c$ $c$, corresponding with the number of molds in a block into the grooves $b$ $b$, from whence it runs into the molds. These nozzles $c$ $c$ $c$ are each fitted with a cock, $d$, to regulate the flow of the lead. Near to the drum C, and over the molds, there is arranged a series of cutters, $e$ $e$ $e$, of chisel or plane like construction, one working in each groove $b$, for the purpose of cutting from the cast bullets the strip of lead which is left in the grooves, and which forms a sprue connecting the balls in adjacent molds. These cutters are hung on a fixed shaft, $f$, arranged parallel with the axes of the drums, and they rest on the bottoms of the grooves $b$ $b$ $b$. At the end of the chain next the said cutters there is attached to a fixed bar, A', a series of springs, $g$ $g$ $g$, corresponding in number with the cutters $e$ $e$ $e$, grooves $b$ $b$ $b$, and the molds in each block, the said springs being arranged to bear upon the edges of the open molds at the part of the belt which is passing round the drum C, and being each provided at its extremity with a sharp tooth, $i$, for the purpose of catching the bullets and pulling out of the open molds any which may have stuck therein. Near the middle of the length of the belt $l$ there is arranged within the said belt a roller, G, upon which the upper part of the belt rests, and which holds up that part of the belt in such a manner (illustrated by Fig. 1) as to cause the molds to open slightly in passing the said roller.

The operations of casting and discharging the bullets from the molds are as follows: Motion is given to the endless belt $l$ and molds by power applied to a drum, $m$, on the shaft of the drum C in such manner as to cause the upper part to move from the melting-pot toward the cutters. As the molds pass the top of the drum B they are closed by the straightening of the belt, and as they arrive near the melting-pot they receive the molten lead which flows from the nozzles $c$ $c$ into the grooves $b$. The distance between the melting pot and the roller G is such that the bullets and the strips of lead which fill the grooves $b$ $b$ and connect the bullets on adjacent molds are set before arriving at the said roller, so that the slight opening which there takes place, as illustrated in Fig. 1, may loosen the bullets while the latter are held by the aforesaid strip. As the molds pass on toward the knives they close again, and as the bullets pass under the cutters $e\ e$ the said cutters, working on the bottoms of the grooves $b\ b\ b$, cut off the aforesaid strips which form the sprues close to the bullets, and as the molds pass over the top of the drum C they open, and the bullets, being now cool, will generally drop out, but in case of their failure to do so will be caught and pulled out by the hooks $i$ on the springs $g\ g\ g$.

The molds may be made to cast bullets of various forms. The endless belt may be dispensed with by connecting the molds together by hinges to make them form a chain; or, instead of a single belt wide enough to carry the molds, two or more narrower belts arranged at distances apart may be used.

What I claim as my invention, and desire to secure by Letters Patent, is—

1. The employment in casting bullets of an endless series of molds carried by one or more endless belts or chains, or connected together to form an endless chain, by whose movement around two drums the molds are opened and closed, substantially as herein specified.

2. The combination, with the endless series of molds, of a knife or knives applied substantially as herein described to cut off the sprues of the bullets.

3. The roller G, applied in combination with the endless series of molds, substantially as and for the purpose herein specified.

4. The toothed springs $i\ i$, applied in combination with the endless series of molds, and operating as herein specified.

5. The combination of the endless series of molds, the roller G, the melting-pot E, the knives $e\ e\ e$, and the toothed springs $g\ g\ g$, the whole arranged and operating substantially as herein specified.

J. P. DRIVER.

Witnesses:
 N. C. MARTIN,
 H. M. MARTIN.